United States Patent
Takasu et al.

Patent Number: 5,835,632
Date of Patent: Nov. 10, 1998

[54] IMAGE PROCESSING METHOD AND AN IMAGE PROCESSING APPARATUS

[75] Inventors: Eiji Takasu, Yokohama; Tsunekazu Arai, Tama; Hiroto Yoshii, Tokyo, all of Japan

[73] Assignee: Canon Kabushiki Kaisha, Tokyo, Japan

[21] Appl. No.: 612,494

[22] Filed: Mar. 7, 1996

[30] Foreign Application Priority Data

Mar. 8, 1995 [JP] Japan ................................ 7-048314

[51] Int. Cl.[6] .................................................... G06K 9/00
[52] U.S. Cl. .................... 382/185; 382/159; 382/187; 382/218
[58] Field of Search .................... 382/159, 161, 382/182, 185, 186, 187, 188, 189, 198, 200, 218

[56] References Cited

U.S. PATENT DOCUMENTS

| | | | |
|---|---|---|---|
| 4,440,513 | 4/1984 | Kataoka | 382/187 |
| 5,138,668 | 8/1992 | Abe | 382/185 |
| 5,325,447 | 6/1994 | Vogt, III | 382/186 |
| 5,333,209 | 7/1994 | Sinden | 382/187 |
| 5,410,612 | 4/1995 | Arai et al. | 382/13 |
| 5,485,531 | 1/1996 | Ichinohe | 382/198 |
| 5,533,141 | 7/1996 | Futatsugi | 382/188 |
| 5,537,489 | 7/1996 | Sinden | 382/187 |

*Primary Examiner*—Jose L. Couso
*Assistant Examiner*—Matthew C. Bella
*Attorney, Agent, or Firm*—Fitzpatrick, Cella Harper & Scinto

[57] ABSTRACT

An image processing system includes entering a predetermined sample character, comparing characteristic data for the sample character with characteristic data for a predetermined reference character, extracting characteristic data inherent to the entered sample character and relative to the reference character, storing the extracted characteristic data, and correcting a character which is newly entered for recognition and different from the predetermined sample character in accordance with the stored characteristic data.

32 Claims, 12 Drawing Sheets

| RECOGNITION RESULT | SCORE | ANGLE θ |
|---|---|---|
| 匂 | 62 | 0 |
| 匂 | 56 | 1 |
| 井 | 53 | 2 |
| 井 | 69 | 3 |
| ... | ... | ... |
| 日 | 98 | 32 |
| ... | ... | ... |
| 匂 | 65 | 359 |

IMAGE PROCESSING METHOD AND AN IMAGE PROCESSING APPARATUS

BACKGROUND OF THE INVENTION

1. Field of the Invention

The present invention relates to an image processing method and an image processing apparatus, and in particular to an image processing method by which an input pattern can be recognized and processed, or by which an image preprocessing can be performed prior to recognition processing, and an image processing apparatus therefor.

2. Related Background Art

Conventionally, a character recognition apparatus, especially, an on-line handwritten character recognition apparatus, compares a character that is handwritten on a tablet with characters that are held in an incorporated recognition dictionary, and outputs, in consonance with the result of the recognition process, a code for a character that is determined to most resemble the input character.

With the current character recognition technique, however, a character that is input by a user can not always be correctly identified.

Therefore, there is one proposal whereby instead of using only the standard recognition dictionary that is stored in advance in a recognition apparatus, additional, special character data for a user, and corresponding character codes, are registered, or existing characters are altered in order to improve the recognition rate.

So long as a character recognition apparatus that adopts the above described conventional method is employed, the following problems will arise.

A possible situation during which such a character addition and registration function is employed is when character data that are entered by a writer are frequently not converted into target character codes, or when character data are found that are not included in the recognition character types that have been added. In other words, a relevant situation is when the additional registration is suddenly performed for a single character type.

If a character shape that is usually entered by a writer shows a personal modification (right side lifted up, tilting, etc.), the same modification will appear in all the character types. In this case, the character recognition rate is low because recognition dictionaries that are incorporated in character recognition apparatuses carry only standard character patterns. One countermeasure that may be taken to avoid this involves the employment of the above character addition and registration function to additionally register individual characters in the recognition dictionary. However, a great amount of effort is required for the job of adding and registering all the characters, especially for a language like Japanese that has an enormous number of types of characters. Even if such a job should be completed for a recognition dictionary, the resulting dictionary would be considerably large.

SUMMARY OF THE INVENTION

To resolve the above conventional problems, one example of a character processing apparatus according to the present invention has the following arrangement. A character processing apparatus, which outputs character data for a handwritten character to a subordinate character recognition process, comprises:

input means for entering a predetermined sample character;

extraction means for comparing characteristic data for the sample character that is entered with characteristic data for a reference character that is related to the sample character, and for extracting character shape data that are inherent to an operator;

holding means for holding the character shape data that are extracted; and correction means for correcting the characteristic data for the handwritten character that is input in consonance with the character shape data that are held by the holding means.

As a result, according to the total characteristics of the character that is input by the operator, the characteristic data for the character that is input by the operator is corrected for, and thus an enhanced recognition rate can be obtained.

Further, it is not necessary to store the personal characteristics of all input characters for all the persons that can act as operators, and an apparatus having a small memory capacity for which there is no limitation on the number operators and that can recognize characters can be provided.

According to preferred embodiments of the present invention, it is desirable that the input means include display means for displaying sample characters with which to prompt character input by an operator. Thus, an operator is prompted to input specific characters, and characters the entry of which is impossible to anticipate can be avoided.

Further, it is preferable that the extraction means employ a characteristic value for the sample character that is input at the input means so as to extract, as the character shape data, a largest rotation angle for a recognition result value that is obtained when a rotation angle of the sample character is sequentially changed. As a result, modified characters can be coped with in most cases.

It is desirable that the correction means rotate the characteristic data for the character that is input in consonance with the rotation angle that serves as the character shape data that are held by the holding means. As a result, adequate data can be transmitted to a subordinate character recognition process.

The extraction means may compute the tilt of the sample character, which is input at the input means, from the characteristic values for the sample character. Thus, a second characteristic for a personally modified character can also be coped with.

It is preferable that the correction means correct data that is related to the tilt of the characteristic data of the character that is input, in consonance with the tilt data that serve as the character shape data that are held by the holding means. Through this process, adequate data can also be transmitted to the subordinate character recognition process.

In addition, it is desirable that the input means input a plurality of sample characters and that the extraction means further include means for computing an average shape for the character shape data for each of the sample characters. Thus, more reliable character shape data can be extracted.

Moreover, it is preferable that the holding means be provided in a nonvolatile storage device. Therefore it may be possible, merely by extracting character shape data, for the execution of an extraction process to be eliminated next time.

DETAILED DESCRIPTION OF THE PREFERRED EMBODIMENTS

The preferred embodiments according to the present invention will now be described in detail while referring to the accompanying drawings.

First Embodiment

Figure 1:
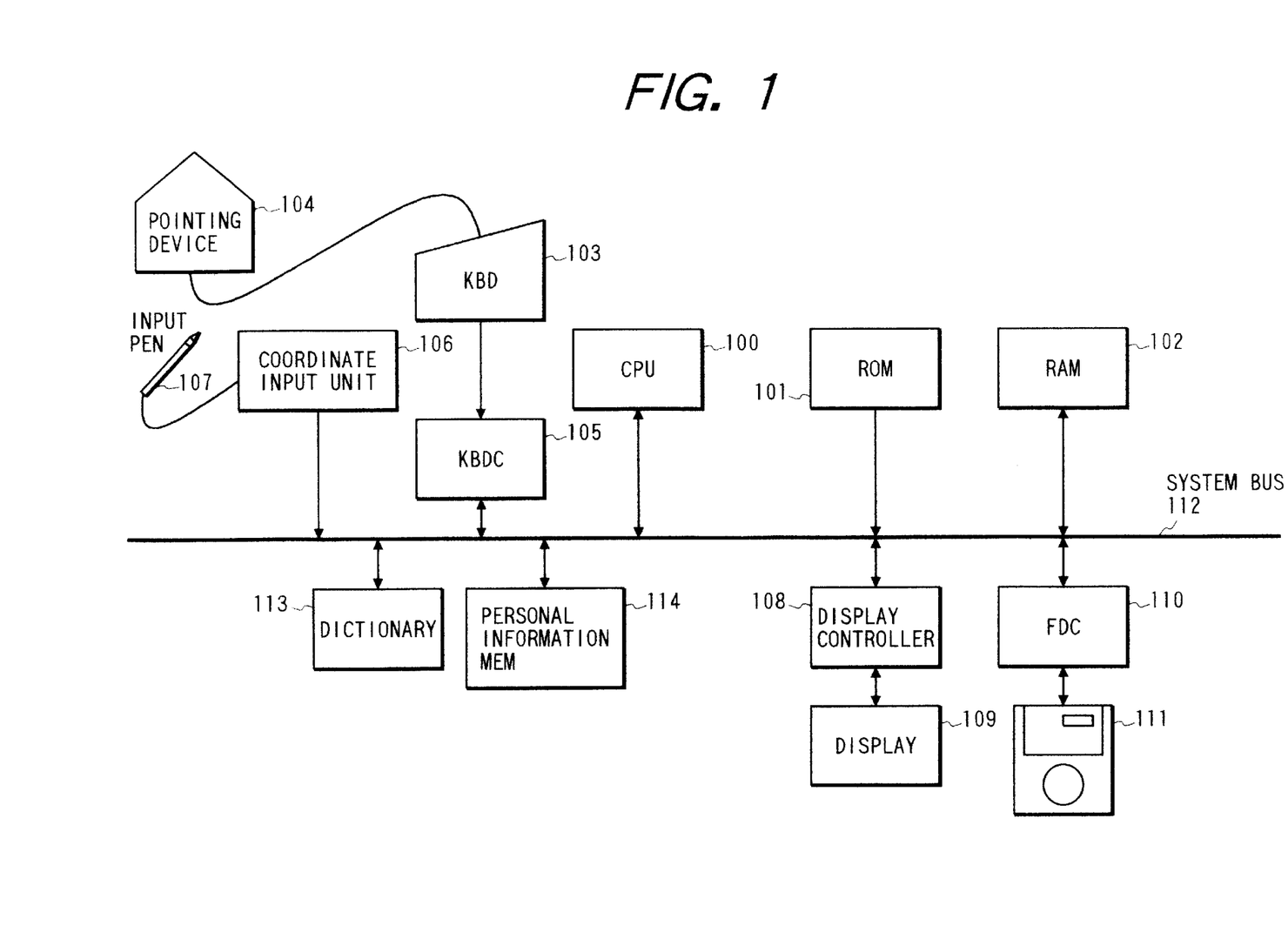
FIG. 1 is a schematic block diagram illustrating the arrangement of a character recognition apparatus according to embodiments of the present invention.

FIG. 1 is a schematic block diagram illustrating the arrangement of a character recognition apparatus according to the preferred embodiments of the present invention. In FIG. 1, a CPU 100 controls the entire apparatus, by executing control programs (a character recognition program, etc.), and the data that are stored in a ROM 101. A control program for a flowchart that will be described later is also stored in the ROM 101. A RAM 120 is employed as a work area for the CPU 100 and for the storage of input character patterns, etc. A KBD 103 is a keyboard, and a pointing device 104 is employed to input positions on a display screen as coordinate data. A keyboard controller (KBDC) 105 is a keyboard controller for controlling the KBD 103 and the pointing device 104.

A coordinate input unit 106 is, for example, a digitizer. Coordinate data for a character pattern that is written on the coordinate input unit 106 with an input pen 107 are entered as input data in the apparatus.

A display controller 108 controls a display 109. The display 109 is a CRT monitor or a liquid crystal display. A controller (FDC) 110 controls an interface for a floppy disk or a hard disk. An external memory device 111 is a floppy disk or a hard disk.

The coordinate input unit 106 is, for example, formed of a transparent electrode, and is laminated with the display 109. The CPU 100 sequentially detects coordinate positions during a period wherein data are entered with the input pen 107 (a period for a pen-down state), and displays on the display 109 dots that correspond to the individual coordinate positions that are detected. In this fashion, the effect is of a character being written or a figure drawn with a pen on paper.

A dictionary 113 carries reference patterns for characters. These reference patterns are employed as comparison data for a character recognition process. A personal modification information memory unit 114 is employed to store handwriting modification information that is inherent to a user. This information is used to reflect the modified shape of a user's handwriting for the character recognition process. The above described data are stored in the external memory device 111, and are read into the dictionary memory as needed and then referred to. A system bus 112 is used to connect the above described individual sections.

Figure 2:
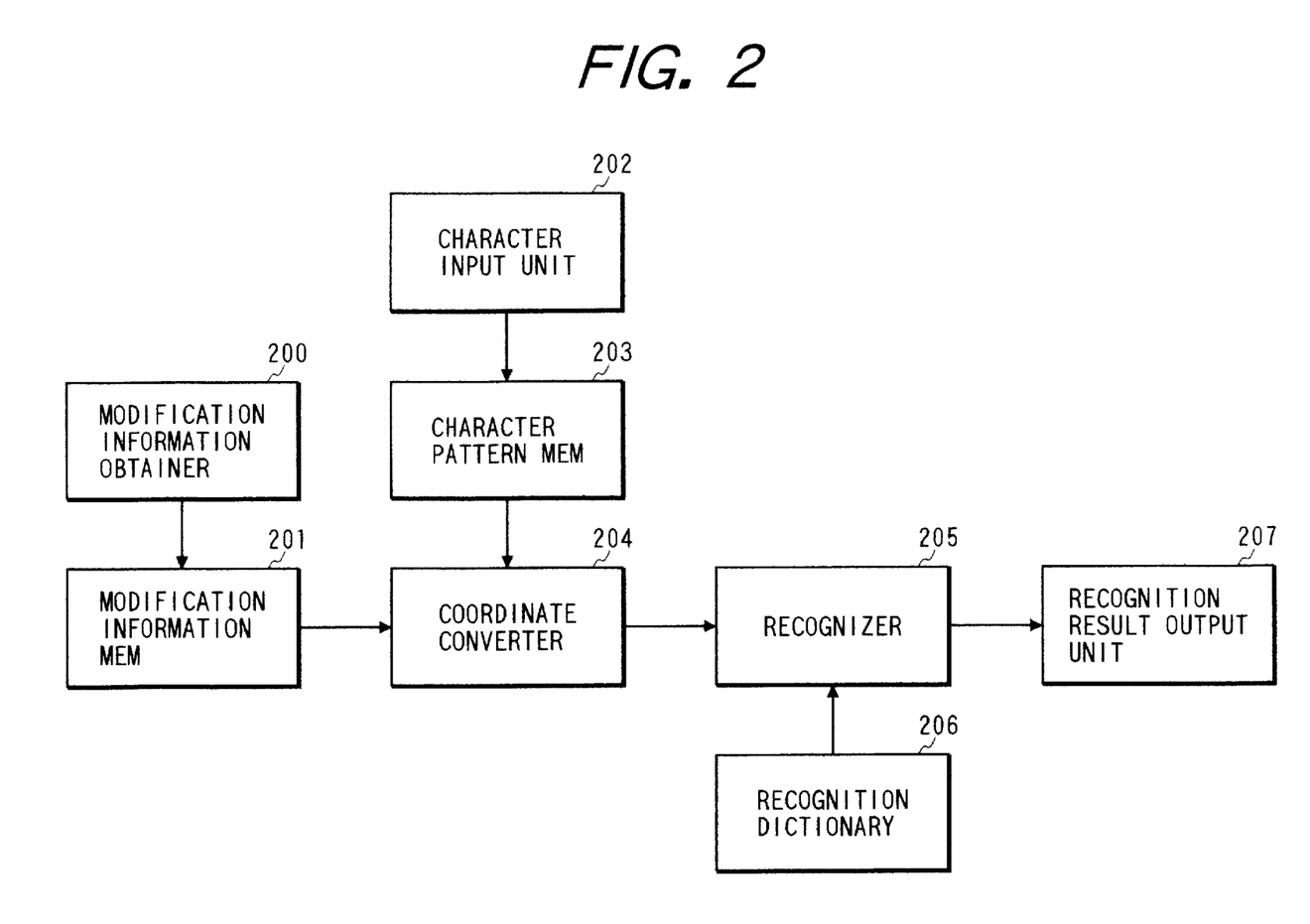
FIG. 2 is a block diagram illustrating the functional structure for a character recognition process in a first and a third embodiment.

FIG. 2 is a conceptual diagram for the character recognition operation of the character recognition apparatus according to a first embodiment of the present invention.

The operation in FIG. 2 will now be explained.

First, information that is input by a character input unit 202 (which corresponds to the CPU 100, the coordinate input unit 106, the input pen 107, and the display 109) is stored in a character pattern memory unit 203 (the RAM 102).

A modification information obtainer 200 (which corresponds to the CPU 100, the character input unit 202, and the dictionary 113) compares the character input by a user (specifically, characteristic information for the input character) with a reference character (specifically, characteristic information that is stored in a dictionary that is utilized for character recognition), and obtains as personal modification information a difference for a user relative to the reference character (specifically, a shift value from the reference character). The modification information is then stored in a modification information memory unit 201 (which corresponds to the external memory device 111).

A coordinate converter 204 (which corresponds to the CPU 100 and one part of the RAM 102) fetches the characteristic information for a character to be recognized from the character pattern memory unit 203, and also fetches the modification information from the modification information memory unit 201. The coordinate converter 204 corrects for the characteristic value of the input character in consonance with the modification information.

For example, when a user tends to write characters that are tilted at an angle θ, the character is rotated inversely the equivalent of the angle θ so that it is positioned similar to the reference character.

Based on the characteristic information obtained for the corrected input character, a recognizer (which corresponds to the CPU 100) utilizes a recognition dictionary 206 to perform character recognition. Upon receipt of the recognition result (a character code), a recognition result output unit 207 (which corresponds to the RAM 102 and the external memory device 111 or the display 109), for example, displays on a screen a reference font pattern that corresponds to the character code that is obtained as the result of the recognition process.

Figure 3:
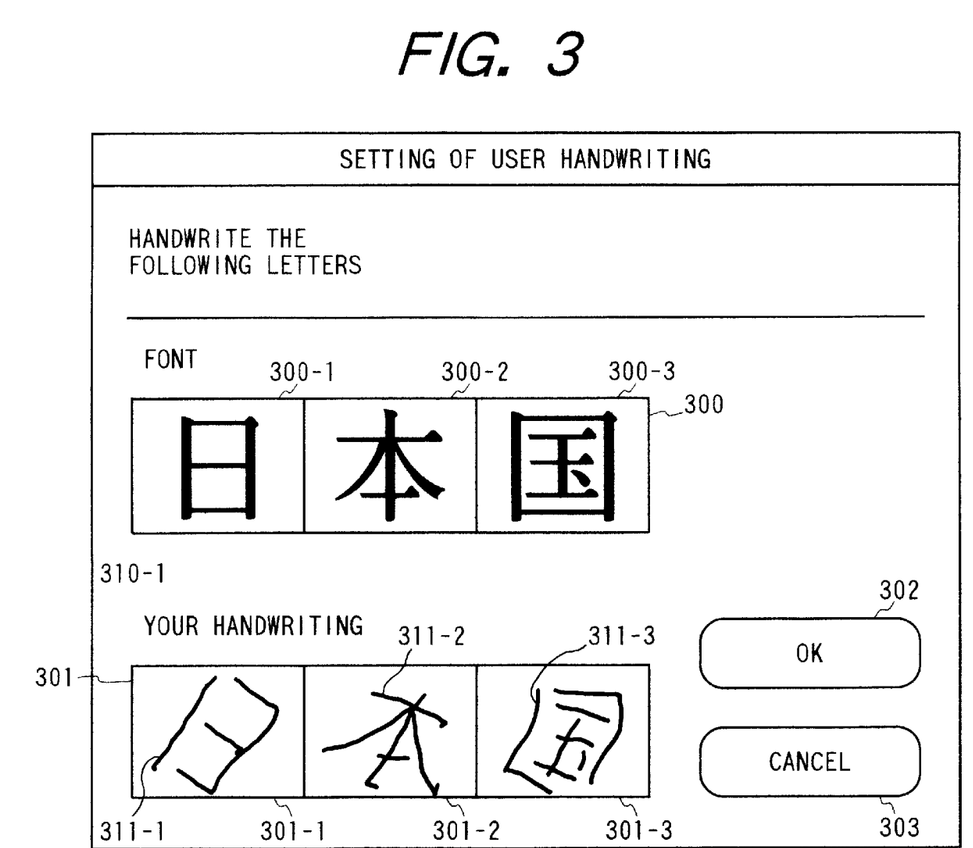
FIG. 3 is a diagram showing an example GUI screen used to acquire handwriting data for a user that are to be stored in modification information memory devices 201 and 901.

The operation for obtaining the modification information that is specific to a user will now be explained while referring to FIG. 3. In FIG. 3 is shown an example condition of the display 109 that in order to acquire modification information for a user prompts the user to input predetermined sample characters.

As is shown in FIG. 3, the operation for acquiring the modification information for the user is performed in a user handwriting setting window for which a GUI (Graphical User Interface) is employed. More specifically, sample letters (a three-letter pattern 310 in FIG. 3) are displayed in a box 300, and a user writes his or her characters in a handwriting input area 301 with the input pen 107. In FIG. 3 is shown the state immediately after the user has entered his or her handwritten forms of the three letters 311-1 through 311-3. When the user taps (or touches) with the pen 107 a setup button 302 that is displayed on the screen, the input job for obtaining modification information for the user is completed. A cancel button 303 can be used to erase the entry of the modification information for the user.

Handwriting information (information from the boxes in which letters are written, and coordinate data sets that are equipped from the handwriting) that is entered in the handwriting input area 301 is stored for each character in a predetermined buffer memory area. An arbitrary character is selected from among these characters, and is employed for the analysis of the handwriting information for the user. In this embodiment, from among the three letters 311-1 through 311-3, the letter that is entered in the leftmost box 301-1 is selected for analyzing the handwriting information.

Figure 4:
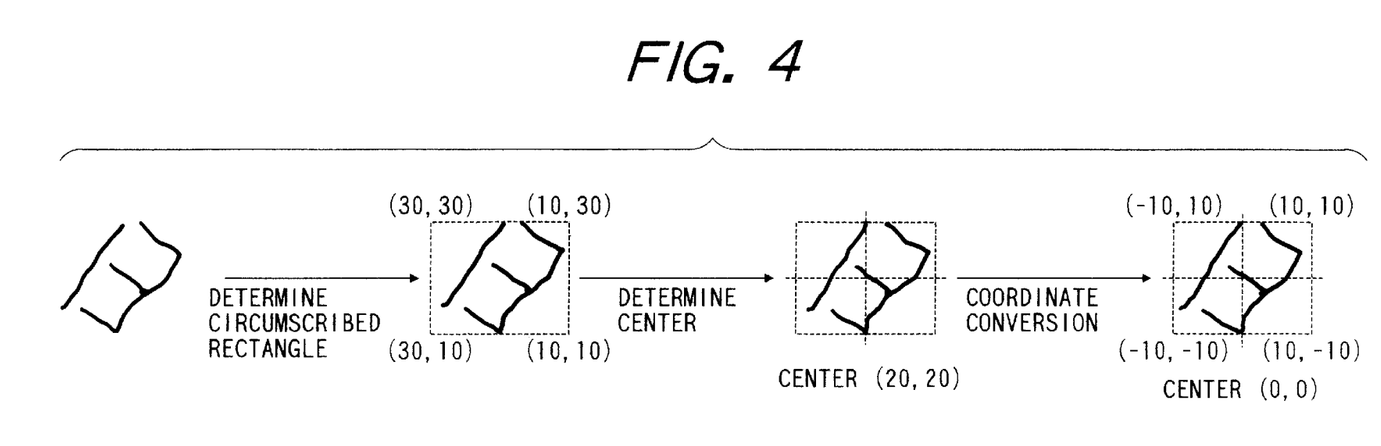
FIG. 4 is a diagram showing a parallel shift conversion of the coordinates of character data.

A method for obtaining the modification information for the user from data, for the character that is written in the character box 301-1, that are stored in the buffer will be explained while referring to FIGS. 4 and 5 and to the flowchart in FIG. 6.

First, the center of the character is acquired. To do this, a circumscribed rectangle of the character data is computed and the center of the rectangle is determined. To make the succeeding computation easier, the center is regarded as the origin (0, 0), and all the character coordinate points are shifted in parallel. The coordinates of a character box in which the character data are written are also shifted in parallel. By means of this operation, the character data 311-1 that are entered in the character box 301-1 are represented by sets of coordinate points that exist on a two-dimensional plane with the origin (0, 0) as the center.

Figure 5:
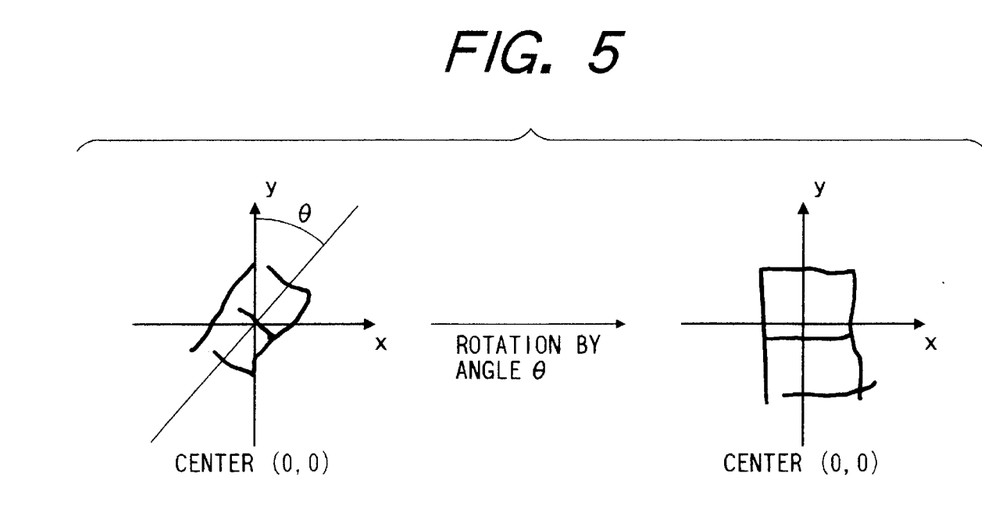
FIG. 5 is a diagram showing a rotation conversion of the coordinates of character data.
Figure 6:
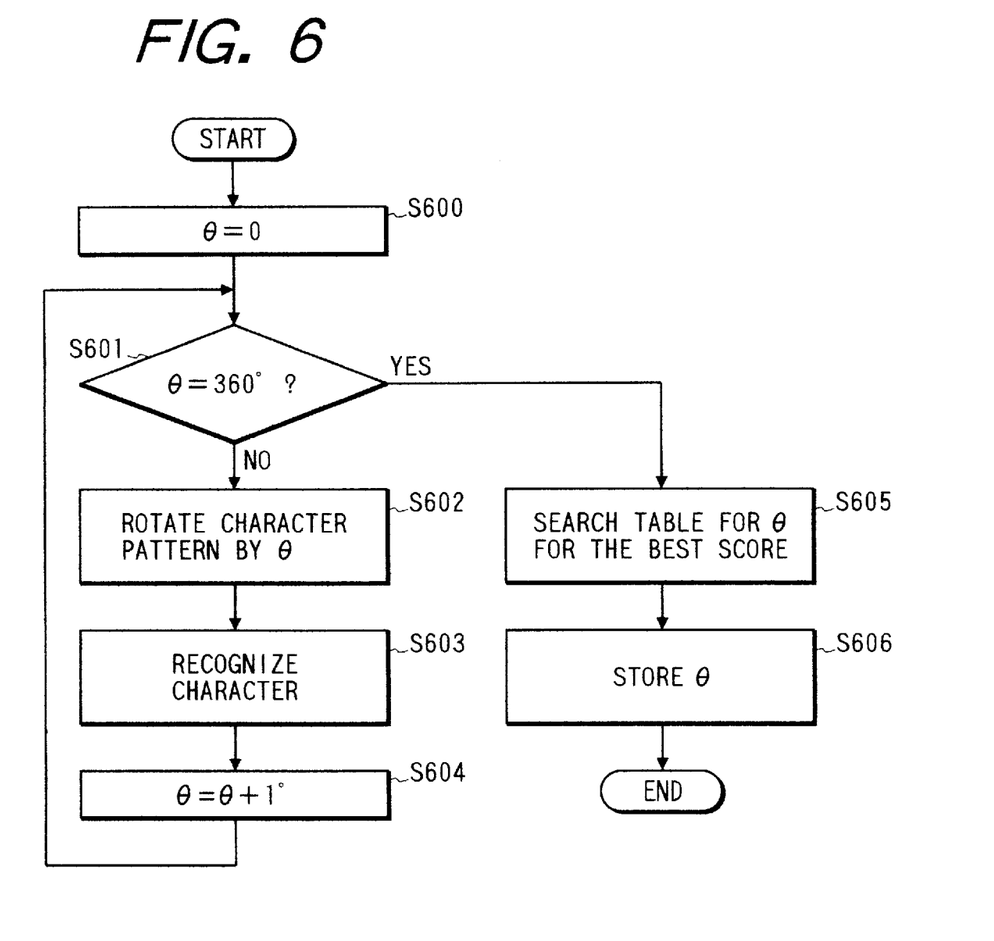
FIG. 6 is a flowchart showing a procedure for computing an optimal rotation angle θ in the first embodiment.

Following this, the best score for the correction of the character data 311-1 is ascertained by rotating coordinate points around the origin, as is shown in FIG. 5. Rotation angle θ is initialized to 0 at step S600.

At step S601, a check is performed to determine whether or not rotation angle θ is finally 360°, i.e., whether or not the processing for all the angles has been completed. Here, the explanation is continued with the assumption that angle θ is not yet 360°.

At step S602, the input character pattern is rotated by current angle θ with the origin as the center. The coordinates obtained by rotation conversion at angle θ are represented by the following expressions. In other words, supposing that the coordinates before the rotation are (x, y) and the coordinates after the rotation are (x', y'), it is well known that x' and y' are represented as:

$$x' = \cos\theta \cdot x - \sin\theta \cdot y$$

$$y' = \sin\theta \cdot x + \cos\theta \cdot y \qquad (1).$$

Figure 8:
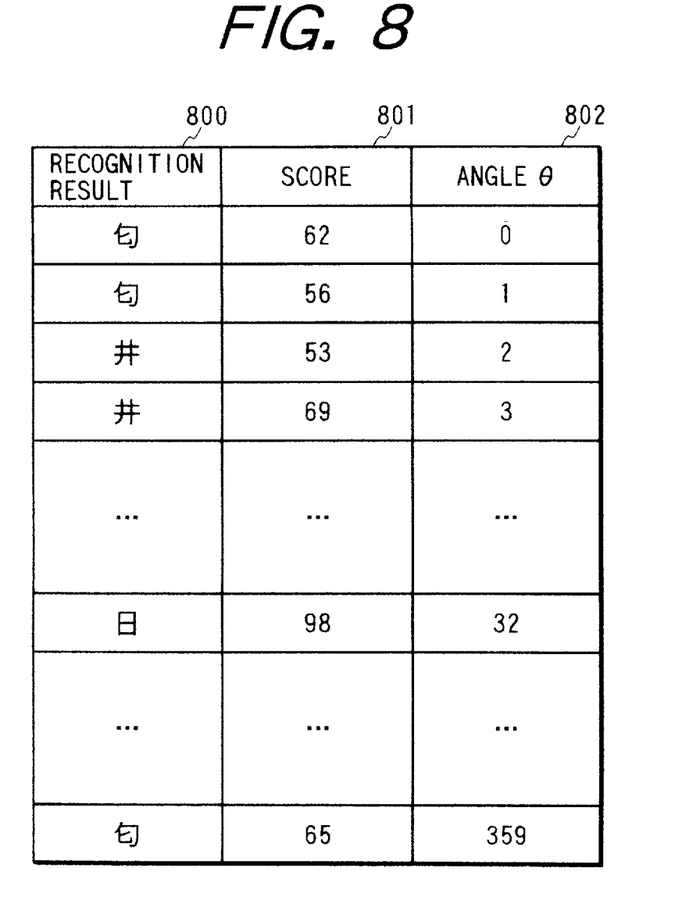
FIG. 8 is a diagram showing the stored condition of information that are generated at step S603 in FIG. 6.

At step S603, a common character recognition process is performed. A character code that is obtained by that process (the most probable character code) and a computation value for that character (i.e., a value that indicates the certainty with which the character code that is obtained is specified) and a value of angle θ at that time are stored in a table, in the memory area (the RAM 102), as table items 800 through 802, as is shown in FIG. 8.

At step S604, angle θ is incremented by 1°, and program control returns to step S601.

When the process for all the angles has been performed, angle θ is finally 360°. Program control then advances from step S601 to step S605. From among the results of the recognition process, which are character codes that are entered in the prepared table that correspond to the character 311-1, the best computation value is searched for, and an angle that corresponds to that data is sought. As a result, as is shown in FIG. 5, it can be seen that the optimal recognition result for the target character is obtained when the character data are rotated at a specified angle.

The obtained angle θ is stored as modification information for the user in the external memory device 111.

In the above example, a common recognition process is performed at step S603. However, since it is determined in advance that the desired character that serves as the recognition result is the character 310-1, only a computation value for this character 310-1 may be acquired. In this case, as only specific information in a recognition dictionary is referred to, the computation speed can be increased.

Since angle θ is uniformly determined through the above process, the character input by the user is corrected by using this angle and recognized. The angle that is determined through the above described process is hereafter referred to as optimal rotation angle θ.

Figure 7:
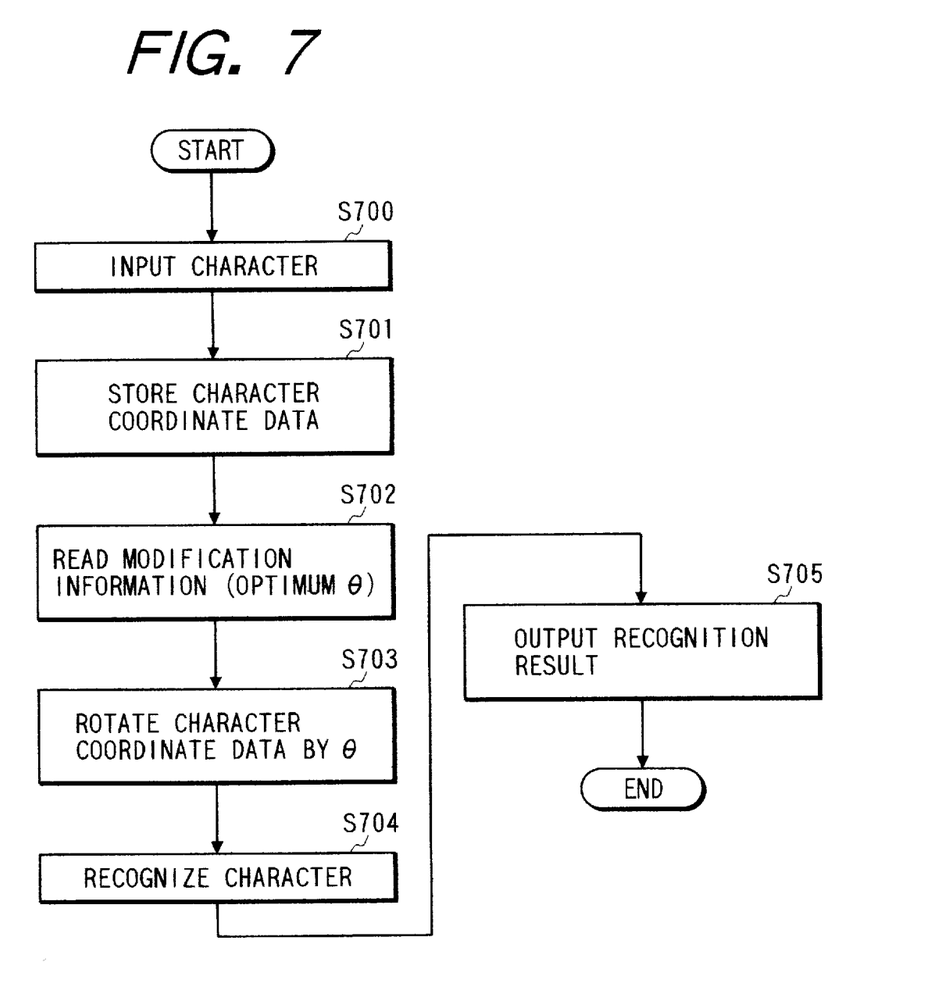
FIG. 7 is a flowchart for a recognition process of the first embodiment wherein personal character modification information for a user is employed.

The character recognition process that is commonly performed in this embodiment will now be described while referring to the flowchart in FIG. 7.

First, at step S700, a user enters a character with the input pen 107 at the character input unit 202. At step S701, the handwriting information is stored as character coordinate data (stroke information for the line segments of the character) in the character pattern memory unit 203 (which is acquired in a predetermined area in the RAM 102).

At step S702, when the character coordinate data are to be recognized, the optimal rotation angle θ for the coordinate point is read from the modification information memory unit 201. At step S703, the coordinate data for the input character are corrected by being rotated the optimal rotation angle θ.

Then, at step S704, the character recognition process is performed by employing the converted coordinate data, and the character code that is obtained as the result of the recognition process is generated. At step S705, a character pattern that is consonant with the character code is output to the display 109, for example.

Second Embodiment

In the above embodiment (the first embodiment), the rotation conversion angle θ is read from the personal modification information memory unit 114 when character recognition is to be performed, and the rotation conversion process is performed on the coordinate data for the input character. In the second embodiment, a method is employed whereby a rotation conversion process is performed on a reference pattern in a recognition dictionary that is employed for character recognition, so that the reference pattern is matched with the input character data. The schematic arrangement in the second embodiment is the same as in the first embodiment, and no explanation for it will be given.

Figure 9:
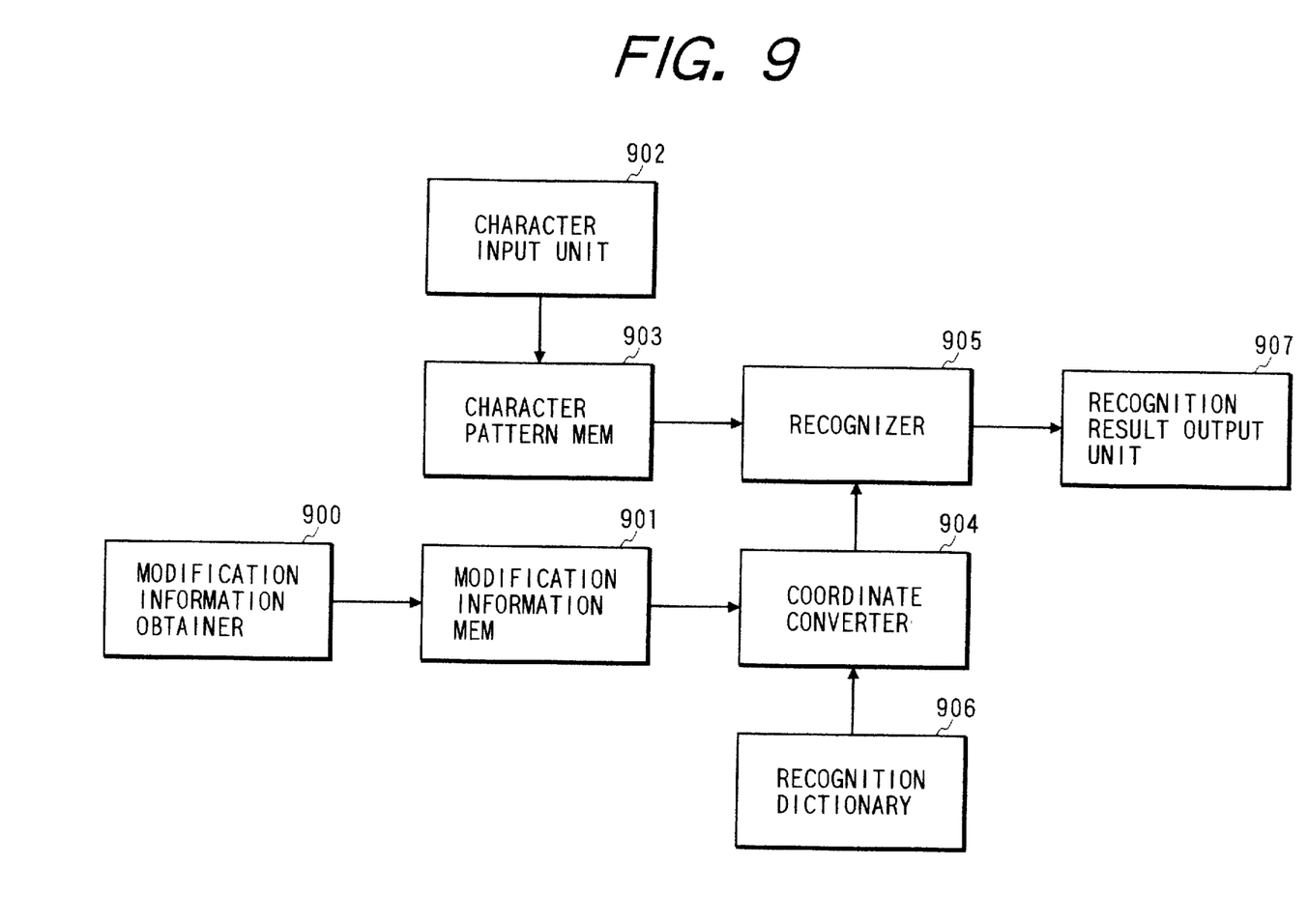
FIG. 9 is a block diagram illustrating the functional structure for a character recognition process in a first and a third embodiment.

FIG. 9 is a functional block diagram for the second embodiment. A modification information obtainer 900 and a modification information memory unit 901 are sections that analyze the handwriting of a user by examining characters that the user enters and then store the obtained data. A method for analyzing the handwriting is provided by performing a rotation conversion process for character data in the same manner as in the first embodiment. The user handwriting setting screen in FIG. 3 is employed as the GUI at this time.

Suppose that the handwriting of the user has been analyzed by the modification information obtainer 900, and the optimal rotation conversion angle θ has been acquired and stored in the modification information memory unit 901.

When the user who has completed the setting for his or her handwriting enters handwritten letters for which a character recognition process is to be performed, a character recognition apparatus in the second embodiment performs the process that follows.

Figure 10:
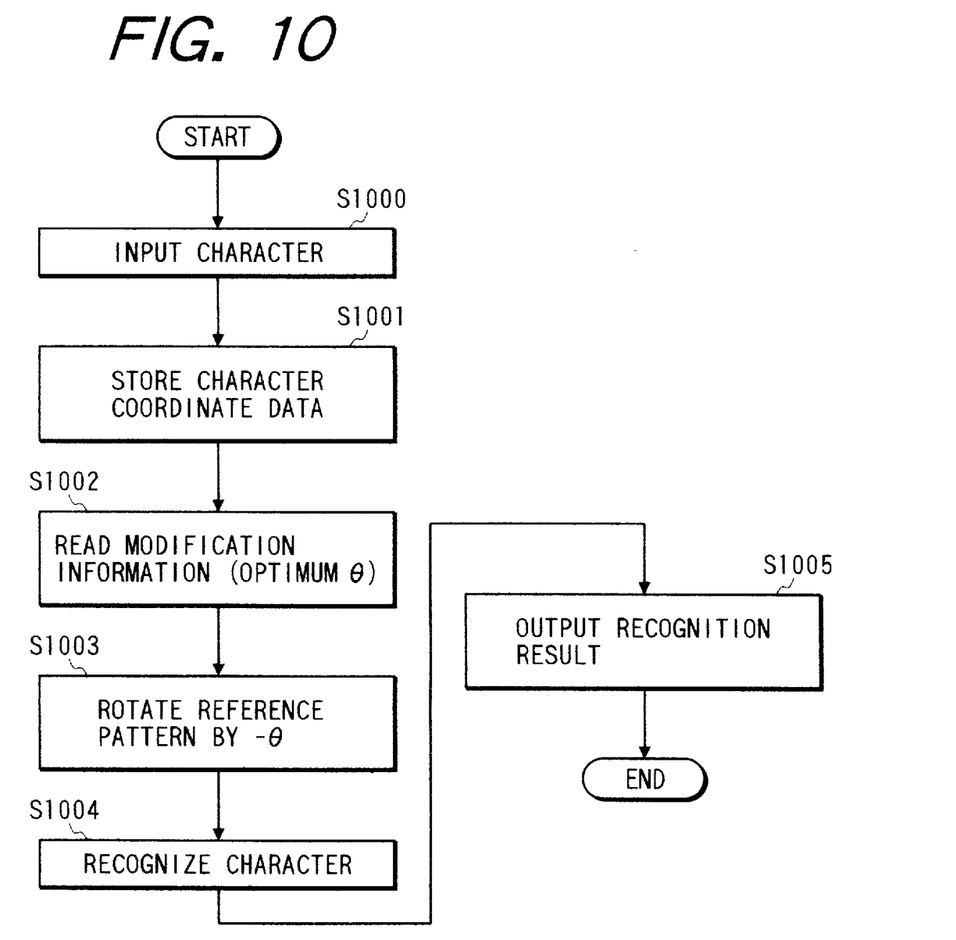
FIG. 10 is a flowchart for a recognition process of a second embodiment wherein personal character modification information for a user is employed.

FIG. 10 is a flowchart showing the processing procedures for the second embodiment.

When, at step S1000, a user enters his or her handwriting at a character input unit 902, at step S1001 the handwriting is stored as character data in a character pattern memory unit 903. At step S1002, a coordinate converter 904 reads the optimal rotation angle θ from the modification information memory unit 901 in order to recognize the character data. Since the angle θ is employed to match the character graphical pattern of the user with the reference pattern that is stored in a recognition dictionary 906, the reference pattern must be rotated (−θ) degrees or (360°−θ) degrees, so that the reference pattern in the recognition dictionary 906 matches the character graphical character pattern of the user. Therefore, based on the rotation angle θ that is read at step S1003, the coordinate data for the reference pattern that is stored in the recognition dictionary 906 is rotated (−θ) degrees. This rotation conversion is performed with the process for expression 1 by which the modification information obtainer 900 computes the optimal rotation angle θ. At step S1004, a recognizer 905 compares the rotated reference pattern with the input character data. As the final result of the recognition process, at step S1005, character code for a character that is determined to be the most similar is transmitted to a recognition result output unit 907, which in turn outputs the result to a display, etc.

Third Embodiment

In the first embodiment, data for one character is used to compute the optimal rotation angle. In the third embodiment, an explanation will be given for a method wherein an optimal rotation angle θ is computed for each of the characters that are written in the handwriting input area 301 (see FIG. 3), with the average value being stored in the modification information memory unit 201. The schematic arrangement and the functional block in the third embodiment are the same as those in the first embodiment (see FIGS. 1 and 2), and no explanation for them will be given.

When a user has entered his or her three handwritten character examples (the characters 311-1 through 311-3 in FIG. 3) on the user handwriting setting screen in FIG. 3 and has tapped the setup button 302, the data for each handwritten character is stored as character data in the buffer of the apparatus.

Figure 11:
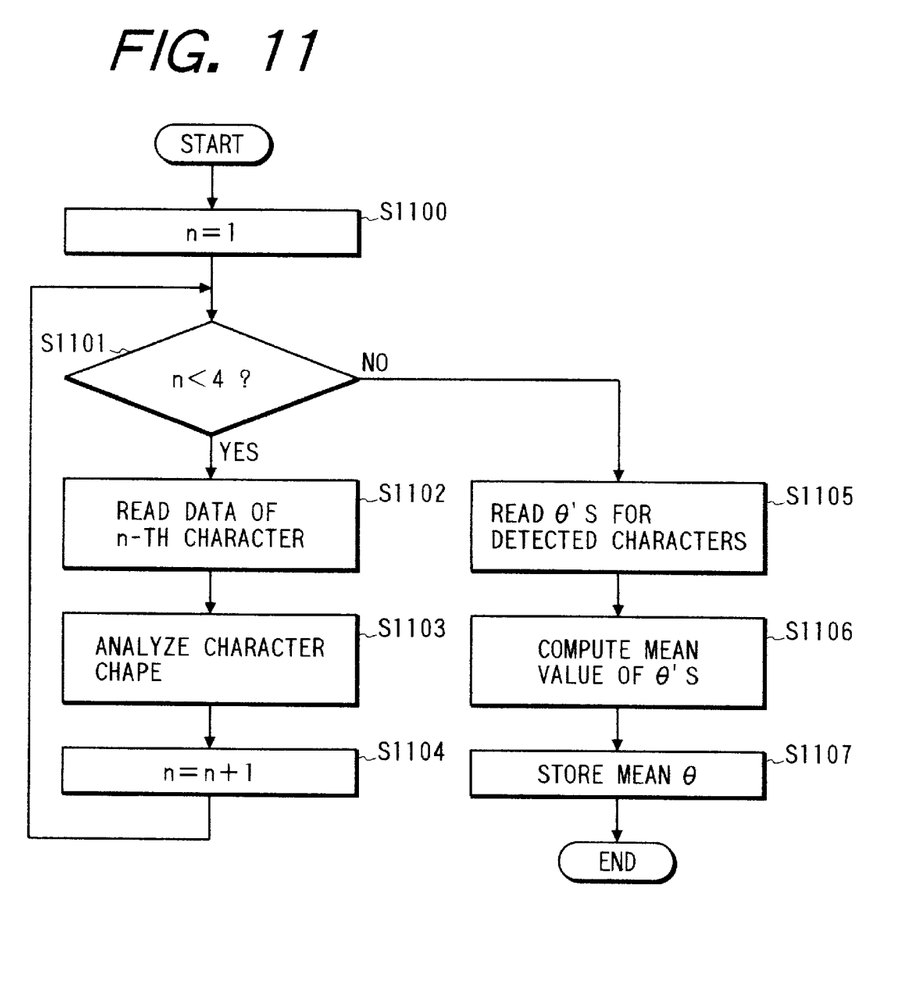
FIG. 11 is a flowchart showing procedures for computing an optimal rotation angle θ in the third embodiment.

FIG. 11 is a flowchart showing a character shape analysis process in the third embodiment.

At step S1100, a character data count n (which is acquired in the RAM 102) is initialized to 1. At step S1102, the n-th character data is read from the buffer. At step S1103, a character shape analysis process is performed for the n-th character data. In this character shape analysis process, the coordinate conversion shown in FIGS. 4 and 5 is performed by using the procedures in the flowchart in FIG. 6. Therefore, no explanation for that process will be given. When rotation angle θ for the n-th target character is determined, that angle θ is stored in a predetermined buffer.

Then, at step S1104, the character data count n is incremented and program control returns to step S1101.

In this manner, the rotation angles θ for the first character 311-1, the second character 311-2, and the third character 311-3 are determined.

When the rotation angles θ for all the characters have been acquired, program control advances to step S1105. The number of rotation angles θ that are stored in the buffer and that are read is equivalent to the count of the detected characters, and at step S1106, the average value of the angles θ is computed. At step S1107, the obtained average rotation angle is stored in the modification information memory unit 114 as handwriting information of a user.

Although the number of character data sets is three in this embodiment, the same process can be performed with character data sets for two characters or more. As the number of character data sets is increased, the more reliable becomes the handwriting information; however, when the number of characters that are to be input is increased, the effort that is required of a user also becomes greater. Therefore, the use of three characters, as in the above embodiment, is appropriate. As an alternate system, a plurality of handwriting input areas may be provided, so that a user can select the number of characters to be input. For example, when a user taps a setup button, the handwriting information is determined in consonance with the number of characters that have been input. In this manner, a user can input an arbitrary number of characters, and the number of the input characters can be used to determine the rotation angles.

Fourth Embodiment

In the individual embodiments, the coordinate conversion by rotation is employed to correct for user specific modifications of graphical characters. In the fourth embodiment, correction means will be described that are used when the handwriting of a user includes parallelogrammic modification.

Figure 12:
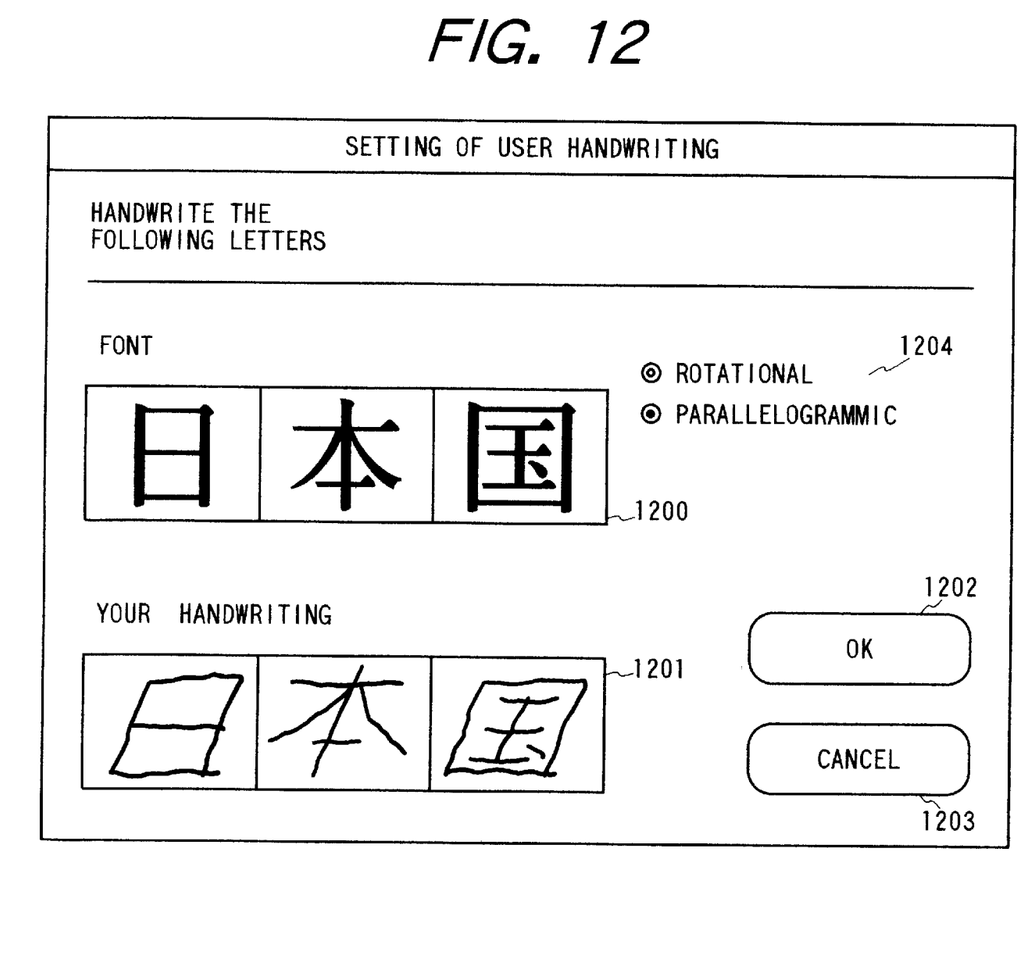
FIG. 12 is a diagram showing an example GUI screen in a fourth embodiment for acquiring handwriting data for a user.

In the fourth embodiment, a user handwriting setting window (which is displayed on the display 109) shown in FIG. 12 is employed to acquire shape modification information that is specific to a user.

Reference number 1200 denotes a sample font. A handwriting entry area 1201 is used for the entry by a user of the same characters as those in the sample font. A button 1202 is used to set the user's handwritten character shapes. By tapping the button 1202, a process for computing modified character shape information is internally begun. A button 1203 is used to cancel the user handwriting setting window. A type selection radio button 1204 is employed by a user to designate his or her handwriting type. In this example, the user selects parallelogrammic type.

Now, the parallelogrammic type is selected by using the type selection radio button 1204, characters (handwriting) are entered in the handwriting entry area 1201, and the setup button 1202 is tapped. Then, the information from the boxes, in the handwriting entry area 1201 in which the characters are written, and the coordinate data that serve as character data are stored for each character in the buffer of the apparatus. Referring to the data in the buffer, the first handwritten character 311-1 has four strokes, and the first stroke and the fourth stroke are employed to compute modified character shape information for the user. As is apparent from the sample font, commonly, the first stroke is designed as a perpendicular stroke line segment, and the final, fourth stroke is a horizontal stroke line segment. The reference pattern that is stored in the recognition dictionary is designed in the same way.

Figure 13:
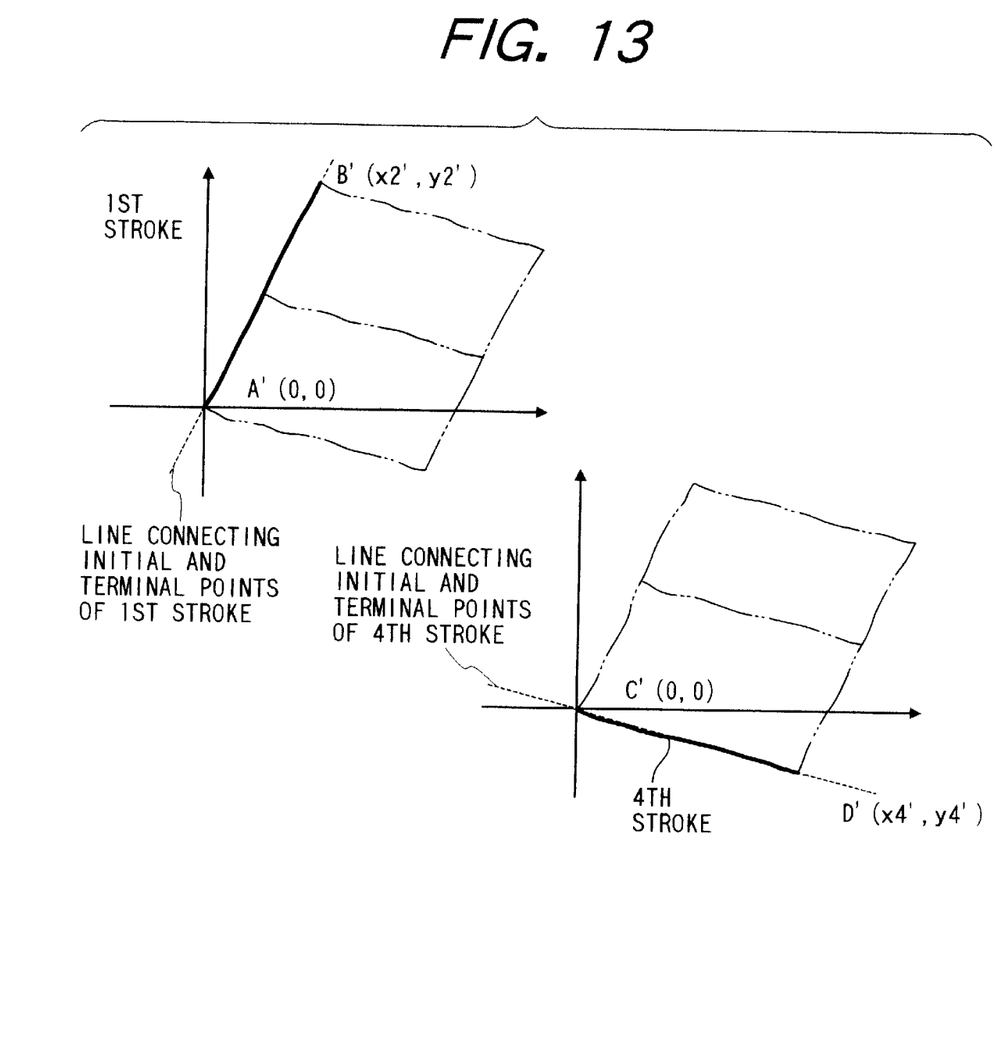
FIG. 13 is a graph showing character tilting according to character data in the fourth embodiment.

The parallelogrammic type is selected as the modified shape type by the user by employing the type selection radio button 1204. The user's modification of character shape is corrected for by using the correction for the perpendicular line segment and for the horizontal line segment. That is, the correction information for the perpendicular line segment of the modified shape is acquired from the first stroke, and the correction information for the horizontal line segment is acquired from the fourth stroke. The coordinates of the initial point of the first stroke is defined as A(x1, y1), the coordinates of the terminal point is defined as B(x2, y2). The coordinates of the initial point of the fourth stroke is defined as C(x3, y3), and the coordinates of the terminal point is defined as D(x4, y4). To simplify the following computation, all the coordinates of the first stroke and of the fourth stroke are shifted, so that the initial point coordinates A(x1, y1) and C(x3, y3) are the origin point (0, 0). This condition is shown in FIG. 13. The coordinates of the initial points and the terminal points after the shifting has been completed are defined respectively as A'(0, 0) and B'(x2', y2') for the first stroke and C'(0, 0) and D'(x4', y4') for the fourth stroke. The expressions for the straight line that runs between the initial points and the terminal points of these strokes are represented as follows.

The expression for the perpendicular line segment of the graphical character pattern of the user is approximately $$y=ax \text{(wherein } a=y2'/x2'\text{)} \quad (2).$$

Similarly, the expression for the horizontal line segment of the graphical character pattern of the user is approximately $$y=bx \text{(wherein } b=y4'/x4'\text{)} \quad (3).$$

User's character pattern P(x, y) is corrected for by using these expressions. From expressions (2) and (3), the expressions for character pattern P' (x', y') after the correction is performed are:

$$x'=x-y/a$$
$$y'=y-bx \quad (4).$$

The process for acquiring expressions (2) and (3) is defined as modification information computation means, with a and b being defined as character modification information for the user, and expression (4) being defined as a process performed by modification information reflection means.

The previously described embodiments can be carried out by using the above described information and process.

The coordinate conversion methods are not limited to these methods that are employed in the embodiments, and other primary conversion process can be performed. In short, the feature of the embodiments is that in principle, the shape type of the characters that are entered by a user can be applied to all the characters that the user inputs, and a correction for an input character is performed in consonance with the character shape information to enable the recognition of the character.

Although a character recognition apparatus has been employed in the embodiments, the present invention is not limited to this apparatus. The present invention can be applied for a character recognition processor, a device that occupies a higher position than the character recognizer, or for a still higher process.

When a character recognition process is to be performed based on angle θ as in the first embodiment, however, a dictionary for character recognition must be referred to, or a dictionary for that process must be independently prepared. Therefore, the character recognition function should be incorporated in a character recognition processor, or as a device, so that an increase in the device size or in the process size can be avoided.

In addition, although the rotation angle or tilting have been employed as character shape information, other references may be so employed. As these two reference data are the main elements that are used for specifying the characteristics of the general characters that are input, however, it is desirable that character shape information that includes one of the two elements be extracted.

Further, although a user directly inputs handwritten characters with a pen in the above embodiments, the present invention is not limited to this input method. For example, a handwritten document may be read by a scanner, or a character image that is received across a network may be employed.

In addition, character shape information may be stored not for only one user but for a plurality of users. In this case, before operating the apparatus, a user enters his or her name and ID so that a recognition procedure can be performed to determine which character shape information to employ.

It is preferable that the character shape information be stored in a nonvolatile storage device, because so long as there is no change in operation, once character shape information has been extracted this task does not need to be performed again later.

The present invention may be applied for a system that consists of a plurality of devices or for an apparatus that consists of a single device. The present invention can also be applied for a case wherein the object can be achieved by supplying a program to a system or to an apparatus.

As is described above, according to the embodiments of the present invention, when a specific modification appears in the handwriting of a user, the handwriting of the user is analyzed. For the next character recognition process, the information obtained by the analysis is employed to perform corrections for character data, so that the character recognition performance can be enhanced. In this case, not as many data are required for character recognition as are required for a conventional personal recognition dictionary. Since only a small amount of data is required for such recognition, the present invention is very economical. And since for handwriting analysis the character recognition apparatus of the present invention has a GUI, which is a user handwriting setting screen, user specific modification information can be easily obtained.

In addition, since a plurality of characters are employed to examine and analyze the handwritten character shape for a user, data can be corrected by using a more accurate value.

With the above described character recognition apparatus, the frequency at which a user is required to set information can be greatly reduced compared with that for a conventional apparatus that utilizes personal information, and the character recognition rate is enhanced.

In the above embodiments, a handwritten character is entered with the input pen at the coordinate input unit and is processed. The present invention is not limited to such character input, and document images can be input by optical image input means, such as scanners, and the characters that are included in the images may be regarded as those that are to be processed. The characters in such a case may be either handwritten or printed. More specifically, printed characters have their own characteristics that depend on the font types and the font generators. According to the present invention, since after the characteristics of printed characters are compensated for, the printed characters can be recognized as easily as can handwritten characters, the recognition rate can be improved.

Further, both the coordinate input unit, for inputting a handwritten character that is entered with the input pen, and an optical image input unit, such as a scanner, are provided as a character input unit. With this arrangement, a predetermined sample character can be input at the optical image input unit and a character to be recognized can be input at the coordinate input unit. Or, just the opposite, a predetermined sample character can be input at the coordinate input unit, and a character to be recognized can be input at the optical image input unit. In other words, one of the features of the present invention is that the characteristics of a user's characters or the characters in a document are extracted in advance from predetermined sample characters, and a correction for character to be recognized is performed in consonance with the extracted characteristic. The methods employed for inputting a predetermined sample character and a character to be recognized do not need to be limited, and differences in the input methods are merely differences in preferable environments, which vary depending on the operational conditions.

What is claimed is:

1. An image processing apparatus comprising:
    input means for inputting a pattern representing a predetermined sample character;
    extraction means for comparing the pattern input by said input means with a reference pattern representing the predetermined sample character, and for extracting characteristic data inherent to the input pattern in accordance with a comparison result;
    holding means for holding the characteristic data extracted by said extraction means, as a correction rule common to a plurality of different patterns representing respective characters to be recognized; and
    correction means for correcting a pattern entered for recognition after said holding means has held the characteristic data and different from the input pattern representing the predetermined sample character, in accordance with the characteristic data held by said holding means.

2. An image processing apparatus according to claim 1, wherein said input means includes display means for displaying sample characters with which to prompt character input by an operator.

3. An image processing apparatus according to claim 1, wherein said extraction means employs characteristic values for said sample characters that are input at said input means so as to extract, as said character shape data, a largest rotation angle for a recognition result value that is obtained when a rotation angle of each of said sample characters is sequentially changed.

4. An image processing apparatus according to claim 3, wherein said correction means rotates said character that is input in consonance with said rotation angle that serves as said characteristic data that are held by said holding means.

5. An image processing apparatus according to claim 1, wherein said extraction means computes a tilt of said sample characters, which are input at said input means, from said characteristic data for said sample characters.

6. An image processing apparatus according to claim 5, wherein said correction means corrects for a tilt of said characteristic data of said character that is input, in consonance with tilt data that serve as said characteristic data that are held by said holding means.

7. An image processing apparatus according to claim 1, wherein said input means inputs a plurality of sample characters and wherein said extraction means further includes means for computing an average shape for said characteristic data for each of said sample characters.

8. An image processing apparatus according to claim 1, wherein said holding means is provided in a nonvolatile storage device.

9. An image processing apparatus according to claim 1, wherein said correction means extracts said characteristic data for characters that are input and performs a correction for said characteristic data that are extracted.

10. An image processing apparatus according to claim 1, wherein said input means is coordinate input means.

11. An image processing apparatus according to claim 1, wherein said input means is a scanner.

12. An image processing method comprising:
    an input step of inputting a pattern representing a predetermined sample character;
    an extraction step of comparing the pattern input in said input step with a reference pattern representing the predetermined sample character, and of extracting characteristic data inherent to the input pattern in accordance with a comparison result;
    a storage step of storing in a predetermined holding means the characteristic data extracted in said extraction step, as a correction rule common to a plurality of different patterns representing respective characters to be recognized; and
    a correction step of correcting a pattern entered for recognition after said holding step has held the characteristic data and different from the input pattern representing the predetermined sample character, in accordance with the characteristic data held by said holding means.

13. An image processing method according to claim 12, wherein said input step includes a display step of displaying sample characters with which to prompt character input by an operator.

14. An image processing method according to claim 12, wherein, at said extraction step, characteristic values for said sample characters that are input at said input step are employed so as to extract, as said character shape data, a largest rotation angle for a recognition result value that is obtained when a rotation angle of each of said sample characters is sequentially changed.

15. An image processing method according to claim 14, wherein, at said correction step, said character that is input is rotated in consonance with said rotation angle that serves as said characteristic data that are held by said holding means.

16. An image processing method according to claim 12, wherein, at said extraction step, a tilt of said sample characters, which are input at said input means, is computed from said characteristic data for said sample characters.

17. An image processing method according to claim 16, wherein, at said correction step, a tilt of said characteristic data of said character that is input, is corrected for in consonance with tilt data that serve as said characteristic data that are held by said holding means.

18. An image processing method according to claim 12, wherein a plurality of sample characters are input at said input step, and wherein said extraction step further includes a step of computing an average shape for said characteristic data for each of said sample characters.

19. An image processing method according to claim 12, wherein said holding means is provided in a nonvolatile storage device.

20. An image processing method according to claim 12, wherein, at said correction step, said characteristic data for characters that are input are extracted and a correction is performed for said characteristic data that are extracted.

21. An image processing apparatus comprising:

input means for inputting a pattern representing a predetermined sample character;

extraction means for comparing the pattern input by said input means with a reference pattern representing the predetermined sample character, and for extracting character shape data inherent to an operator in accordance with a comparison result;

holding means for holding the character shape data extracted by said extraction means, as a correction rule common to a plurality of different patterns representing respective characters to be recognized; and correction means for correcting characteristic data for a handwritten character entered for recognition after said holding means has held the characteristic shape data and different from the input pattern representing the predetermined sample character, in accordance with the character shape data held by said holding means; and character recognition means for recognizing the characteristic data corrected by said correction means.

22. An image processing apparatus according to claim 21, wherein said input means includes display means for displaying sample characters with which to prompt character input by an operator.

23. An image processing apparatus according to claim 21, wherein said extraction means employs characteristic values for said sample characters that are input at said input means so as to extract, as said character shape data, a largest rotation angle for a recognition result value that is obtained when a rotation angle of each of said sample characters is sequentially changed.

24. An image processing apparatus according to claim 23, wherein said correction means rotates said characteristic data for said character that is input in consonance with said rotation angle that serves as said character shape data that are held by said holding means.

25. An image processing apparatus according to claim 21, wherein said extraction means computes a tilt of said sample character, which is input at said input means, from said characteristic values for said sample character.

26. An image processing apparatus according to claim 25, wherein said correction means corrects data that is related to a tilt of said characteristic data of said character that is input, in consonance with tilt data that serve as said character shape data that are held by said holding means.

27. An image processing apparatus according to claim 21, wherein said input means inputs a plurality of sample characters and wherein said extraction means further includes means for computing an average shape for said character shape data for each of said sample characters.

28. An image processing apparatus according to claim 21, wherein said holding means is provided in a nonvolatile storage device.

29. An image processing apparatus according to claim 21, wherein said input means is coordinate input means.

30. An image processing apparatus according to claim 21, further comprising display means for displaying a character pattern that is obtained as a result of a character recognition process performed by said character recognition means.

31. A computer-readable memory medium which stores computer-executable process steps, the computer-executable process steps to process an image, the computer-executable process steps comprising:

an input step to input a pattern representing a predetermined sample character;

an extraction step to comparing the pattern input in the input step with a reference pattern representing the predetermined sample character, and to extract characteristic data inherent to the input pattern in accordance with a comparison result;

a storage step to store in a predetermined holding means the characteristic data extracted in the extraction step, as a correction rule common to a plurality of different patterns representing respective characters to be recognized; and a correction step correct a pattern entered for recognition after the holding step has held the characteristic data and different from the input pattern representing the predetermined sample character, in accordance with the characteristic data held by the holding means.

32. A computer-readable memory medium which stores computer-executable process steps, the computer-executable process steps to process an image, the computer-executable process steps comprising:

an input step to input a pattern representing a predetermined sample character;

an extraction step to compare the pattern input by the input means with a reference pattern representing the predetermined sample character, and to extract character shape data inherent to an operator in accordance with a comparison result;

a holding step for holding the character shape data extracted by the extraction means, as a correction rule common to a plurality of different patterns representing respective characters to be recognized; and a correcting step to correct characteristic data for a handwritten character entered for recognition after the holding means has held the characteristic shape data and different from the input pattern representing the predetermined sample character, in accordance with the character shape data held the holding step; and a recognizing step to recognize the characteristic data corrected in the correcting step.

* * * * *